(12) United States Patent
Amat

(10) Patent No.: US 11,313,230 B2
(45) Date of Patent: Apr. 26, 2022

(54) REINFORCED BLADE

(71) Applicant: Ratier-Figeac SAS, Figeac (FR)

(72) Inventor: Pascal Amat, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 624 days.

(21) Appl. No.: 15/806,477

(22) Filed: Nov. 8, 2017

(65) Prior Publication Data

US 2018/0128112 A1 May 10, 2018

(30) Foreign Application Priority Data

Nov. 8, 2016 (EP) ..................................... 16306461

(51) Int. Cl.
| | |
|---|---|
| *F01D 5/14* | (2006.01) |
| *B64C 11/20* | (2006.01) |
| *B64C 11/26* | (2006.01) |
| *B23P 15/04* | (2006.01) |
| *B65H 51/00* | (2006.01) |
| *F01D 5/28* | (2006.01) |

(52) U.S. Cl.
CPC .............. *F01D 5/147* (2013.01); *B23P 15/04* (2013.01); *B64C 11/205* (2013.01); *B64C 11/26* (2013.01); *B65H 51/00* (2013.01); *F01D 5/282* (2013.01); *F05D 2230/60* (2013.01); *F05D 2240/304* (2013.01); *F05D 2300/2102* (2013.01); *F05D 2300/224* (2013.01); *F05D 2300/601* (2013.01); *F05D 2300/603* (2013.01); *F05D 2300/612* (2013.01); *Y10T 29/49337* (2015.01)

(58) Field of Classification Search
CPC .......... F01D 5/147; F01D 5/232; F01D 5/282; F05D 2240/304; F05D 2300/603; F05D 2300/6034; F05D 2300/601; F05D 2300/612; F05D 2230/60; F05D 2300/2102; F05D 2300/224; B64C 11/26; B64C 11/205; Y10T 29/49337; B23P 15/02; B23P 15/04
USPC ..... 416/224, 226, 229 R, 229 A, 230, 241 A
See application file for complete search history.

(56) References Cited

U.S. PATENT DOCUMENTS

| | | | |
|---|---|---|---|
| 1,901,864 A | 3/1933 | Bellanca | |
| 1,946,129 A | 2/1934 | Cebulski | |
| 4,206,895 A | 6/1980 | Olez | |
| 4,648,921 A | 3/1987 | Nutter, Jr. | |
| 4,664,961 A | 5/1987 | Vees et al. | |
| 5,222,297 A * | 6/1993 | Graff ...................... | B64C 11/26 29/889.71 |
| 5,308,228 A | 5/1994 | Benoit et al. | |

(Continued)

FOREIGN PATENT DOCUMENTS

| | | |
|---|---|---|
| FR | 2684719 A1 | 6/1993 |
| GB | 2249592 A | 5/1992 |

OTHER PUBLICATIONS

European Search Report for Application No. 16306461.1-1754 dated May 12, 2017, 7 pages.

*Primary Examiner* — Christopher Verdier
(74) *Attorney, Agent, or Firm* — Cantor Colburn LLP

(57) ABSTRACT

A propeller blade comprises a root, a tip distal from the root, a trailing edge extending from the root to the tip, a trailing edge, e.g. foam, insert, a shell forming an outer surface of the propeller blade and a plurality of stitches of yarn extending through two parts of the shell adjacent the trailing edge, wherein the yarns do not extend through the trailing edge insert.

19 Claims, 2 Drawing Sheets

(56) References Cited

U.S. PATENT DOCUMENTS

| | | | |
|---|---|---|---|
| 6,024,325 A | 2/2000 | Carter | |
| 6,431,837 B1 | 8/2002 | Velicki | |
| 7,247,212 B2 | 7/2007 | Kostar et al. | |
| 7,600,978 B2 | 10/2009 | Vance et al. | |
| 8,357,323 B2 | 1/2013 | Morrison et al. | |
| 9,248,612 B2 | 2/2016 | Zhu et al. | |
| 10,407,159 B2 * | 9/2019 | Amat | D05B 69/32 |

* cited by examiner

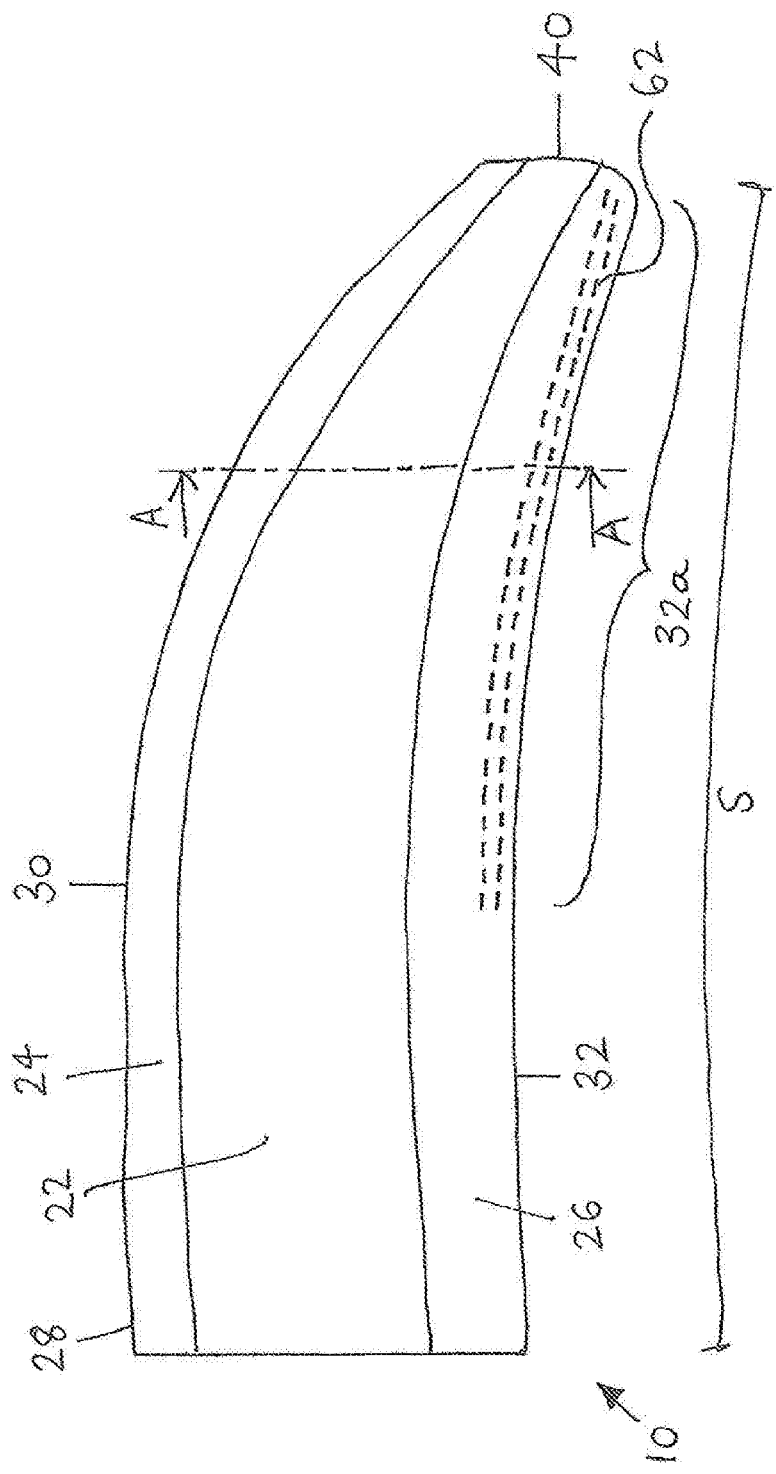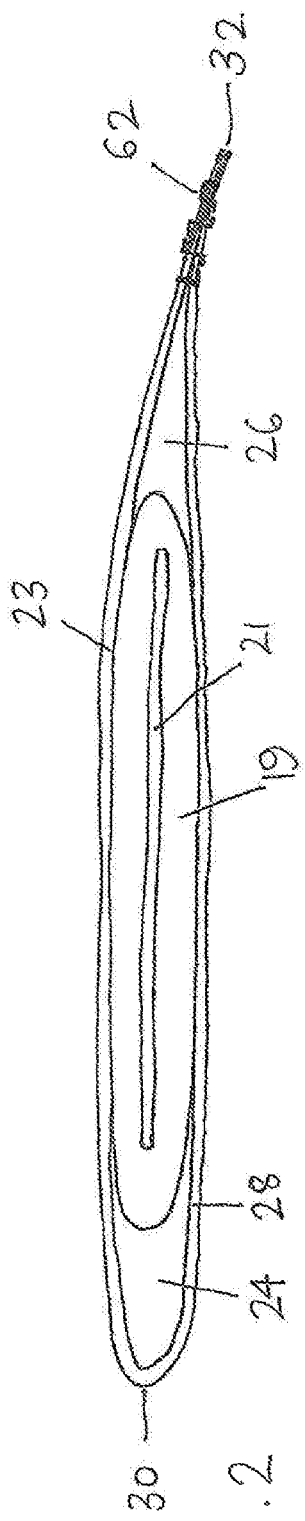

REINFORCED BLADE

FOREIGN PRIORITY

This application claims priority to European Patent Application No. 16306461.1 filed Nov. 8, 2016, the entire contents of which is incorporated herein by reference.

TECHNICAL FIELD

The present disclosure relates to reinforced propeller blades.

BACKGROUND

The efficiency of a propeller blade may be improved by decreasing the aerodynamic thickness and radius of the propeller blade at its trailing edge. However, reducing the thickness and radius of a propeller blade also reduces the structural integrity of the blade. Propeller blades may need a high damage tolerance capacity in order to prevent foreign object damage (FOD) from bird impact, for example.

Propeller blades may include leading edge and trailing edge inserts to create the desired aerodynamic profile of the blade and a shell surrounding the inserts to provide structural strength to the blade. The thickness of the blade at the trailing edge is therefore limited by the thickness of the trailing edge insert and the shell.

SUMMARY

From a first aspect, this disclosure provides a propeller blade comprising a root, a tip distal from the root, a trailing edge extending from the root to the tip, a trailing edge, e.g. foam, insert, a shell forming an outer surface of the propeller blade and a plurality of stitches of yarn extending through two parts of the shell, for example two opposing parts of the shell, adjacent the trailing edge, wherein the yarns do not extend through the trailing edge insert.

The stitches of yarn may be formed from at least one yarn extending through the parts of the shell at more than one point along the span of the blade.

The plurality of stitches may comprise a row of stitches extending along a portion of the span of the blade from the tip thereof, for example, least two rows of stitches extending along a portion of the span of the blade.

The portion may extend along less than 70% of the span and more than 20% of the span of the blade.

The propeller blade may further comprise a laminate sheet of composite material extending from a core of the propeller blade towards the trailing edge, wherein the stitches of yarn also extend through the laminate sheet.

This disclosure also provides a method of manufacturing a propeller blade comprising arranging a lightweight e.g. foam, trailing edge insert adjacent a trailing edge of a structural spar, surrounding the insert and structural spar with a shell and threading a yarn through the shell adjacent the trailing edge such that the yarn extends through two parts of the shell, for example two opposing parts, but does not extend through the insert.

Threading may be performed before surrounding the insert and structural spar with the shell.

The shell may include at least two layers surrounding the blade and the yarn may be threaded through two parts of each of said at least two layers, the method further comprising cutting an outer layer of the at least two layers after the threading.

The threading may be performed with a vibrating needle or by tufting.

The threading may include forming at least one row of stitches extending along a portion of the span of the blade from the tip thereof, the portion extending along less than 70% of the span and more than 20% of the span of the blade.

The method may further comprise bonding a laminate sheet to the structural spar and threading the yarn through the laminate sheet.

The yarn may be formed from carbon, glass or Kevlar®.

BRIEF DESCRIPTION OF DRAWINGS

Some embodiments of the disclosure will now be described by way of example only and with reference to the accompanying drawings in which:

FIG. 1 shows a portion of a propeller blade according to an embodiment of the invention;

FIG. 2 shows a cross-sectional view of the propeller blade of FIG. 1 taken through line A-A;

DETAILED DESCRIPTION

Figure 3:
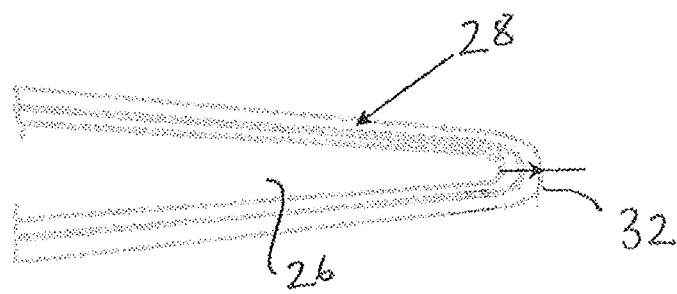
FIG. 3 shows the trailing edge of a propeller blade of the prior art.

With reference to FIG. 1, an exemplary propeller blade 10 is illustrated. The propeller blade 10 has a leading edge 30, a trailing edge 32 a root (not shown) and a tip 40. The blade 10 further includes a structural spar 22, a leading edge insert 24 and a trailing edge insert 26.

The structural spar 22 includes a central structural member 21, a spar foam material 19 surrounded by the central structural member 21 along at least a portion of the length of the central structural member 21 and an outer structural member 23, surrounding central structural member 21 and the spar foam 19 along the entire length of the spar 22. Although the described embodiment includes a spar foam material 19 in a central region thereof, it will be appreciated that the disclosure is applicable to hollow spars having a hollow central region with little or no foam material therein and spars having no core at all.

The central structural member 21 may be formed from pre-impregnated laminate sheets (pre-pregs). The pre-pregs may be impregnated with resin or thermoplastic material. Pre-pregs may increase the stiffness of the foam to facilitate braiding thereon, by reducing or preventing bending or deflection of the foam. Pre-pregs may also help prevent infiltration of resin into the foam material during construction of the spar. The spar foam 19 is formed from PU (polyurethane) foam material, although other foam or lightweight materials may be used, such as honeycomb materials or balsa. The outer structural member 23 may be in the form of a braided layer, for example comprising carbon fibres, although other structural materials may be used. In embodiments, the outer structural member 23 comprises unidirectional plies of carbon fibres.

The leading edge and trailing edge inserts 24, 26 are positioned adjacent the leading edge and trailing edge of the spar 22 respectively and are surrounded by a shell 28, for example, a Kevlar® sock. In alternative embodiments the shell 28 could be in the form of a glass fibre or carbon fibre shell.

The blade 10 includes stitches of yarn 62 along the trailing edge 32 of the blade 10. The trailing edge stitches 62 extend from the tip 40 of the blade 10 towards the root of the blade 10 along a portion 32a of the trailing edge 32. Although the trailing edge stitches 62 of the embodiment extend over a portion 32a that is about one third of the length of the trailing edge 32, it will be appreciated that the stitches may extend over a greater or lesser extent of the trailing edge 32 as required.

As shown in FIG. 2, the trailing edge stitches 62 extend through plies of the shell 28 only. That is, there is no foam material of the trailing edge insert 26 between the plies of the shell 28 through which the trailing edge stitches 62 extend. The trailing edge stitches 62 therefore act to clamp two opposing parts of the shell 28 together, away from the foam insert 26 in order to allow a thickness of the blade 10 at the trailing edge 32 that is equal to the twice the thickness of the shell material 28 only.

For illustrative purposes, FIG. 3 shows a detail view of the trailing edge of a propeller blade 10 according to a known design. The trailing edge of blade 10 includes a trailing edge insert 26 and a shell 28, such as a Kevlar® sock, extending around the insert 26. It will be appreciated that the minimum thickness of the blade 10 of this design is therefore limited by the thickness of the insert 26 at its trailing edge as well as the thickness of the shell material 28.

Figure 4:
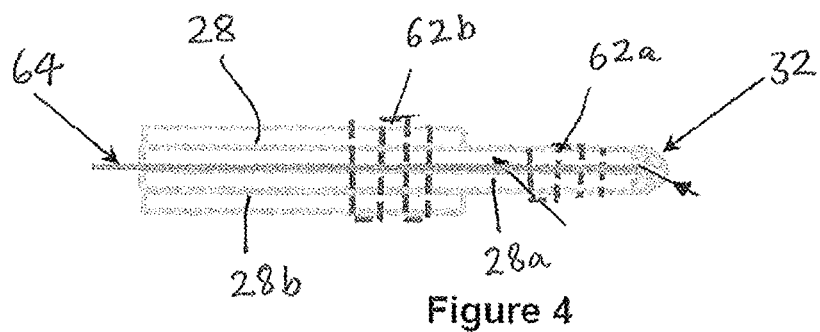
FIG. 4 shows the trailing edge of a propeller blade according to an embodiment of the invention.

FIG. 4 shows a detail view of a trailing edge region of a propeller blade 10 according to a further embodiment. The trailing edge 32 further includes a sheet 64 of pre-preg material. The sheet 64 may be formed from plies of carbon or glass fibre fabric impregnated with an epoxy resin or thermoplastic material. The sheet 64 may be a separate sheet 64 bonded to the central structural member 21. The sheet 64 extends towards the trailing edge 32 of the blade 10 beyond the trailing edge insert 26 without foam material or hollow space therein. The sheet 64 may extend along part of or the whole of the span S of the spar 22. In these embodiments, the sheet 64 may be formed in a similar manner as described above. For example, pre-pregs for forming the sheet may be placed in the mould and kept in compression along the trailing edge such that they are bonded together and no foam is injected therebetween.

Shell material 28 extends around the sheet 64. In this embodiment a first layer 28a of shell material extends around the trailing edge of the sheet 64 to form the trailing edge 32 of the blade 10. Further layers or plies 28b are attached to the first layer 28a on an outer surface thereof on either side of the sheet 64. The further layers 28b do not extend all the way to the trailing edge 32 of the blade 10; rather they are spaced therefrom to further reduce the thickness of the blade 10 at its trailing edge 32. The further layers 28b could be formed by cutting the outer layers of the shell 28 after application to the blade 10 or could be cut or separately formed prior to application to the blade 10.

In the embodiment of FIG. 4, the shell material 28 includes two, spaced apart rows of stitches 62 in two regions adjacent the trailing edge 32. The first row of stiches 62a extends through the sheet 64 and the first layer of shell material 28a only. The second row of stitches 62b extends through the sheet 64, the first layer of shell material 28a and the further layers of shell material 28b.

The shell 28 may be stitched prior to attachment or may be provided with additional pre-preg plies positioned in the trailing edge 32 to draw out the shell 28 and enable subsequent stitching of the trailing edge 32 in situ. Shell 28 and spar 22 are injected with resin and the blade 10 is then cured. In this way, the leading edge and trailing edge foam inserts 24, 26 are bonded to the shell 28 and the shell 28 is also bonded to the spar 22, in a single co-curing process.

In any of the embodiments described above, the stitches of yarns 62 may be arranged such that a single yarn 62 extends through the shell 28 more than once. For example, a single yarn 62 may extend through the shell 28 three or more times over a portion or the entire span S of the blade 10. Such yarns 62 may be threaded through the blade 10 in any number of ways as known in the art. For example, the yarns 62 may be threaded through the blade 10 using a stitching machine or by tufting. Stitching could be performed by various methods as known in the art including with or without knots. In embodiments, the stitching may be performed with a vibrating needle. The vibration applied to the needle facilitates puncturing of the shell 28 and/or sheet 64. Tufting may involve inserting the yarns 62 through the shell 28 using a needle that, after insertion, moves back along the same trajectory leaving a loop of the yarn 62 on the bottom of the structure. All of the above-described threading techniques may be performed automatically. For example, stitching may be performed by a robot having a stitching head and needle mounted thereto.

Each yarn 62 or portion of yarn 62 extending through the shell 28 may be spaced from an adjacent yarn 62 or portion of yarn 62 extending through the shell 28 by a uniform distance across the span of the blade 10. For example the yarns 62 might be spaced between 3 and 15 millimetres apart, for example 5 millimetres in the span S direction.

Each yarn 62 may be formed from a dry carbon, glass or Kevlar® dry fibre material and may include a plurality of filaments of dry fibre material twisted with or bonded with one another to form a yarn 62.

Stitches of yarn 62 in the trailing edge 32 of the blade 10 help reduce the thickness of the blade 10 in this region as described above. The yarns 62 may also reduce the amount of shell 28 repair required as a result of de-burring resin after curing the blade 10. For example, the yarns 62 may help hold the shell 28 together to prevent cutting of the shell 28 when the blade 10 is being de-burred.

The yarns 62 adjacent the trailing edge 32 help reduce the aerodynamic thickness of the blade's profile and thereby increase the efficiency of the blade 10. The yarns may further improve static and fatigue inter-laminar shear strengths (ILSS) of the composite blade 10 and improve damage tolerance and FOD strength.

The invention claimed is:

1. A propeller blade comprising:
    a root;
    a tip, distal from the root;
    a trailing edge extending from the root to the tip;
    a structural spar;
    a trailing edge insert arranged between the structural spar and the trailing edge;
    a shell forming an outer surface of the propeller blade, wherein the shell is a glass fiber resin shell or a carbon fiber resin shell; and
    a plurality of stitches of yarn extending through two opposing parts of the shell adjacent the trailing edge, wherein the yarns do not extend through the trailing edge insert.

2. The propeller blade of claim 1, wherein the stitches of yarn are formed from at least one yarn extending through the opposing parts of the shell at more than one point along the span (S) of the blade.

3. The propeller blade of claim 1, comprising a row of stitches of yarn extending along a portion of the span (S) of the blade from the tip thereof.

4. The propeller blade of claim 3, comprising at least two rows of stitches of yarn extending along the portion of the span of the blade.

5. The propeller blade of claim 3, wherein said portion extends along less than 70% of the span (S) from the tip and more than 20% of the span (S) of the blade from the tip.

6. The propeller blade of claim 1, further comprising a laminate sheet of composite material extending from the structural spar of the propeller blade towards the trailing edge and extending between the opposing parts of the shell, wherein the stitches of yarn also extend through the laminate sheet.

7. The propeller blade of claim 1, wherein the yarn is formed from carbon or glass.

8. The propeller blade of claim 1, wherein the trailing edge insert is a foam insert.

9. The propeller blade of claim 1, wherein the structural spar comprises:
    a spar foam material;
    a central structural member surrounding the spar foam material; and
    an outer structural material surrounding the central structural member.

10. The propeller of claim 9, wherein the central structural member comprises a laminate sheet of composite material and the outer structural material is in the form of a braided layer.

11. A method of manufacturing a propeller blade comprising:
    arranging a trailing edge insert adjacent a trailing edge of a structural spar;
    surrounding the trailing edge insert and structural spar with a shell such that the trailing edge insert is arranged between the structural spar and a trailing edge of the propeller blade, wherein the shell is a glass fiber resin shell or a carbon fiber resin shell; and
    threading a yarn through the shell adjacent the trailing edge of the propeller blade such that the yarn extends through two opposing parts of the shell but does not extend through the trailing edge insert.

12. The method of claim 11, wherein the threading is performed before surrounding the insert and structural spar with the shell.

13. The method of claim 11, wherein the shell includes at least two layers surrounding the blade and the yarn is threaded through two parts of each of said at least two layers, the method further comprising cutting an outer layer of the at least two layers after the threading.

14. The method of claim 11, wherein the threading is performed with a vibrating needle.

15. The method of claim 11, wherein the threading is performed by tufting.

16. The method of claim 11, wherein the threading includes forming at least one row of stitches extending along a portion of the span (S) of the blade from a tip thereof, the portion extending along less than 70% of the span (S) from the tip and more than 20% of the span (S) of the blade from the tip.

17. The method of claim 11, further comprising bonding a laminate sheet to the structural spar and threading the yarn through the laminate sheet.

18. The method of claim 11, wherein the yarn is formed from carbon or glass.

19. The method of claim 11, wherein the trailing edge insert is a foam insert.

* * * * *